Patented Feb. 29, 1944

2,342,634

UNITED STATES PATENT OFFICE 2,342,634

METHOD OF TREATING FIBROUS MATERIAL AND PRODUCT RESULTING THEREFROM

Francis Clarke Atwood, Newton, Mass., assignor, by mesne assignments, to National Dairy Products Corporation, New York, N. Y., a corporation of Delaware No Drawing. Application August 23, 1939, Serial No. 291,616

18 Claims. (Cl. 8—115.5)

This invention relates to the treatment of synthetically formed protein containing materials and to the products obtained thereby. In particular, the invention includes the treatment of synthetic fiber of protein material, such as casein, to impart thereto properties simulating those of natural protein fiber; the invention also includes the resulting treated fiber.

Many naturally occurring materials are comprised of proteins, for example, silk, wool, hair and skins. Artificial materials are also manufactured from protein containing material, such as casein and soya bean protein, and are formed into various shapes, such as fibrous filaments, films and plastic forms, but such artificial protein materials differ in many respects from the natural protein materials.

Protein containing materials have many desirable properties that render them valuable for use in fabrics of all kinds, such as covering materials and upholstery, and for use in articles of clothing including clothes, shoes and gloves. These properties include the warmth, softness, flexibility, tensile strength, elasticity and other similar properties of protein containing materials, and are hereinafter referred to as physical properties.

All proteins contain carbon, hydrogen, oxygen and nitrogen and many proteins also contain sulfur and phosphorous. The proteins are thought to contain amino and probably hydroxy and carboxyl groups, and are more or less chemically reactive depending upon their individual constitution. For example, different proteins are affected differently by hot water, alkaline or soap solutions. Over long periods of time some proteins also oxidize or otherwise deteriorate more rapidly than others so as to become somewhat brittle and lose their strength and softness. Different proteins also react differently with various other compounds, particularly dyes. In referring to the chemical properties of protein containing materials, I refer to their ability to combine physically or react chemically with any other compound such as oxygen, water, acids, alkalies and dyes.

The chemical properties of synthetic protein containing materials, in many instances, leave much to be desired.

I have discovered that the chemical properties of synthetic protein materials may be changed by reaction with certain chemical compounds to impart more desirable chemical properties and without detracting from their physical properties. They may be made more resistant to chemical activity, but at the same time remain soft and pliable and retain or even improve their tensile strength and other properties.

It is, therefore, an object of my invention to treat synthetic protein materials to alter their chemical constitution, and thereby alter their chemical properties, without detracting from their desirable physical properties.

In particular, I have discovered that if synthetic protein materials are acylated they become more resistant to water, acids and particularly alkaline solutions, and that their chemical reactivity with respect to chemical compounds, such as dyes, is altered.

A more specific object of my invention, therefore, is to provide a process of treating synthetic protein materials with an acylating agent.

A further object of my invention is the treatment of synthetic protein materials with an acylating agent in the presence of a reaction facilitating agent, which is in the nature of a catalyst, and which greatly speeds the reaction, but which may itself combine with the protein during the treatment.

While I may treat any synthetic protein material in accordance with my invention, such as fiber, film and products of various form, particularly those made from casein from milk or soya bean, I will describe my invention primarily with reference to the treatment of fiber made artificially from casein or soya bean protein and which has at times been referred to for descriptiveness as synthetic wool. I shall refer to such material as synthetic protein fiber and I have selected it as illustrative of my invention.

Synthetic protein fiber when made by any of the processes heretofore known, or by the process which I have invented and which is the subject matter of separate patent applications, is not as resistant to hot water as might be desired, particularly if the water contains an alkaline material as would be present in a hot solution of an ordinary soap. Upon heating or boiling the synthetic protein fiber in an aqueous solution it becomes soft and takes on a slippery and slimy feel; the tensile strength of the fiber and its elasticity in the wet state are reduced so that the fiber is readily deformed or broken. Upon drying synthetic protein fiber that has been subject to such treatment, it becomes somewhat brittle and also possesses less tensile strength.

The process comprising my invention alters the fiber so that it will withstand boiling for long periods of time in water and in dilute acids;

it also can withstand vigorous mechanical treatment combined with caustic or other alkaline material, even after dyeing, such as a series of dyeing, fulling and scouring operations. The fiber obtained by my process is greatly superior to that obtained by any of the known alum or formaldehyde treatments.

Synthetic protein fiber, before treatment in accordance with my invention, also has dyeing properties which in many instances are undesirable. In the manufacture of mixed products composed of fiber from more than one source, for example synthetic protein fiber and natural wool, it is desirable that both materials of the mixture shall behave uniformly towards the same dye. A dye should not color one material and leave the other colorless, nor should it color them in different amounts or shades or at different rates. Synthetic protein fiber, in particular, differs in its dyeing properties from natural wool and other natural protein fibers and in its untreated state cannot be used in mixed goods to yield evenly dyed products. Synthetic protein fiber treated in accordance with my invention has its dyeing properties improved and rendered similar to those of natural protein fiber so that it can be used in admixture therewith to obtain an evenly dyed product.

It will be seen that the untreated synthetic protein fiber differs materially from natural protein fibers, and to such an extent that it may be considered to present problems that are unique.

It is therefore an object of my invention, in particular, to alter the chemical properties of synthetic protein fiber so that it will equal or surpass the resistance of natural protein fiber to boiling and to acid and alkali solutions, and approach as nearly as possible the dyeing properties of natural wool or other natural protein fiber either in pot dyeing or calendar dyeing.

It is an additional object of my invention to treat synthetic protein fibers continuously as a part of a continuous process.

A further object of my invention is to treat synthetic protein fibers while under tension so as to obtain greater wet and dry strength, and a greater wet-dry strength ratio.

Synthetic protein fiber may be made by dissolving or dispersing casein or soya bean protein with an alkaline material or other dispersing agent, for example as described in my application, Serial No. 142,574, filed May 14, 1937. Various plasticizing or softening materials may be included, although I prefer a solution in which caustic soda is the sole dispersing ingredient. The protein or casein solution is then extruded through small holes in a spinnerette to form fibers which are coagulated or hardened by means of an acid containing bath, after which the fibers may be further treated with chemicals such as acids, salts or formaldehyde or a mixture thereof. The production of the fiber involves many details including the materials and methods of placing the casein in solution, the method of spinning, coagulating, treating, drying and the like. Many of such details are to be described and claimed in a copending application. But such details with respect to the invention herein claimed are not critical, because the invention is applicable to the treatment of synthetic protein fiber produced not only by my process, but also to the treatment of any other synthetic protein products.

In accordance with my invention a synthetic protein material is treated with any acylating and preferably any acetylating agent of the type hereinafter described. Acetic anhydride, ketene, aldo- and keto-ketenes, and ketenes of lower fatty acids, such as butyl, proponyl, and amyl, are mentioned as illustrative.

Gaseous acylating agents, such as ketene, are preferred for the reason that it is generally more convenient to treat a protein material with a gas than a liquid. These compounds are similar in that they each contain the group

$$\overset{|}{C}=C=O$$

which appears to be an acylating group.

I will describe my process as employing ketene inasmuch as this is probably the least expensive and more readily available material. While ketene has the advantage of being gaseous, and therefore convenient to apply, and other advantages from the chemical standpoint, I do not intend to exclude the use of any other acylating agent from the scope of my invention.

The action of the various ketenes, and particularly ketene, may be more than that of a mere acylating agent, as will be pointed out later in connection with the possible reactions involved. I believe that the ketenes may also block the active groups in the protein and cause a reaction that is similar to condensation or polymerization, or both. By the words "ketenizing" and "ketenized" I refer to the new results as accomplished by the ketenes described herein, which besides true acylation, may comprise condensation, polymerization and other similar forms of denaturation of the protein.

Ketene is a gas which is readily obtained by heating or cracking acetone vapor. It may be readily prepared by vaporizing acetone and passing the vapor through a heated copper tube. The acetone decomposes into ketene and methane. The methane generated with the ketene and admixed therewith is inert, and its presence is unobjectionable. In fact, it is sometimes desirable in that it is a convenient diluent for the ketene and assists in regulating the speed of the reaction. Other diluents, such as carbon dioxide, may be employed if a non-explosive mixture is desired.

Ketene can also be generated from acetic acid and by other processes.

In accordance with an illustrative embodiment of my invention, the synthetic protein fiber is surrounded with ketene that has been produced as above described.

The reaction may be carried out at any temperature under proper conditions, for example at room temperature or at an elevated temperature, for example of the order of 175 to 212° F. The heat of the reaction resulting from a combination of the ketene with the protein may raise the temperature slightly. This heat may be utilized in maintaining an elevated temperature, if desired, particularly if no external heat is applied, but the generated heat may be readily dissipated if the temperature becomes higher than that to be used under the desired conditions.

The length of time during which the fiber is exposed to the ketene is not critical, as long as polymerization of the ketene does not occur; the length of exposure will depend upon the concentration of the ketene in the gas surrounding the fiber, the extent to which the fiber is to be acylated, the temperature, and the use of a catalyst to accelerate the reaction. At room temperature and without a catalyst the reaction may take several hours. At an elevated temperature and with a catalyst it may be complete in several minutes. An elevated temperature is particularly desirable when a catalyst is not employed, as the ketenization of fibers at room temperature is particularly slow if no catalyst is used.

The process may be carried out in either a batch operation or as a continuous process. The apparatus to be employed is not critical and while some forms are preferred, the process may be carried out in any apparatus by means of which the fiber can be surrounded by or subjected to the ketene. This will depend somewhat on whether the fiber is treated when in the form of staples or as continuous strands.

Inasmuch as the ketene is very reactive with protein, it is desirable to contact the fibers as uniformly with the ketene as possible in order that the reaction may be uniform throughout the mass of fiber. The fiber at the time of treatment with the ketene or before may be fluffed up or otherwise expanded as much as possible so that all of the filaments can be contacted with the ketene gas from all sides as much as possible.

One method of carrying out the process is to place the fiber in a confined cabinet or box, preferably on trays, and introduce the ketene gas into a confined space. This is particularly adapted to the treatment of staples by a batch method.

I have found that it is desirable in a batch operation of this type to agitate the fiber during the treatment in order that it may more uniformly contact the ketene during the treatment. This may be accomplished conveniently by means of a rotating drum containing movable fingers for moving the fiber in the ketene gas.

The process is particularly applicable to a continuous treatment of the fiber. In such a process the fiber will be introduced, either as staples or continuous strands of filaments, through an elongated confined space which may or may not contain means for agitating the fiber within the confined space. The ketene will be passed through the space, in the direction the fiber is moved or preferably countercurrent to the fiber so that the untreated fiber which is in the most reactive condition, will be contacted with the ketene in the greatest degree of dilution. The fiber that has already been subjected to the ketene, and which will be the least reactive, will be subjected to the ketene in a greater concentration. The process may be regulated so that the gas exiting from the confined space will have had all the ketene removed therefrom by reaction with the protein. This exiting gas will contain primarily methane which can be used for fuel in the cracking operation or for sources of heat in other operations in the process. If it is desired to treat the fiber with a more dilute mixture of ketene than that obtained from the cracking operation, a portion of the exiting methane may be recirculated as the diluting medium. This may be applied to either a continuous or batch operation.

If the fiber is being manufactured in a continuous process, a strand or rope of continuous filaments is moved at a uniform rate through a pipe or similar conduit which is filled with the ketene gas. The ketene may be passed through the pipe countercurrent as explained heretofore. Suitable sealing means at each end of the pipe may be provided, particularly at the end from which the fiber exits and the ketene enters. A liquid seal, such as water or mineral spirits is suitable. The rate of movement of the fiber, and the length of the treating zone through which it passes, should be such that the fiber will remain in contact with the ketent for sufficient time to complete the reaction. In a continuous manufacturing operation, the filaments may pass advantageously from a drier into the ketenizing zone. Since the ketenizing operation can be carried out when the fiber is not entirely dried and when it contains 10% to 20% moisture, it is unnecessary to carry the drying operation to completeness.

Prior to the introduction of the rope of filaments into the ketenizing zone, the individual filaments should be separated from each other as much as possible such as subjecting to air jets or mechanical means for fluffing out and separating the individual filaments so that they will not stick or adhere to each other, and can be surrounded as nearly as possible with ketene gas.

I have found that a temperature of about 175° F. to 230° F. is suitable in the continuous process of treating strands of fiber with ketene. This can be accomplished by means of a jacket surrounding the pipe through which the fiber is moved, through which jacket hot water or steam at atmospheric or under pressure may be passed. Temperatures above this can be used and the upper limit is not critical. The treatment of the fiber at this temperature is advantageous because the fiber is at about this temperature when it leaves the drying zone and immediately enters the ketenizing zone.

At such an elevated temperature and with the aid of a catalyst, the reaction is completed in several minutes, which is the length of time required for the fiber to pass through the treating chamber in the continuous operation. The reaction at the higher temperature also is relatively complete and the ketene combines with the fiber even though the ketene is present in relatively low concentrations. The rate of reaction at the higher temperature, in addition, is more rapid and more uniform, resulting in a fiber having advantageous characteristics. When employing an elevated temperature, any acetone carried into the ketenizing zone in a gaseous state is not condensed on the fiber and can be recovered from the gases exiting from the ketenizing zone. The presence of acetone on the fiber is not necessary or helpful at the higher temperatures.

When the process is applied to the treatment of continuous strands, it is preferred to keep the fiber under tension as it is being ketenized. If the fiber is kept under tension while the chemical change is taking place in the molecules of the protein they become better aligned or oriented and a preferred and stronger fiber is obtained, particularly when wet. In addition, at elevated temperatures, the protein approaches a more plastic state and as it is subjected to tension, it is in a condition to be drawn out into filaments of smaller diameter as the chemical reaction is occurring.

The amount of ketene which is absorbed by and reacted with fiber in either a batch or continuous operation varies with the length of the treating operation, the temperature, concentration of the ketene and the presence and nature of a catalyst or material to facilitate the reaction. Amounts of about 15% of ketene, based on the original weight of the fiber can be absorbed and reacted with the protein to great advantage. Amounts in excess of this generally do not produce superior products, and an excess of the ketene may result in a conversion of the ketene into ketene polymers. In general 5% to 10% produces acceptable products. The addition of 2 or 3% renders the synthetic protein fibers somewhat resistant to moisture and chemicals, but not as completely as in the case when the fibers absorb a larger amount. Less than 2% does not produce fibers having properties sufficiently improved for most purposes to warrant the treatment.

It is essential that the ketene should be supplied to the fiber in a sufficient amount and concentration to permit a reaction to the desired extent. This is particularly important in a continuous process in which a definite amount of fiber is moving through the treating zone at a given rate. It is essential to supply the ketene to the treating chamber at such a rate that an amount of ketene will be present to permit from 3% to 15% to combine with the fiber while it is passing through the treating zone. Vice versa, if the rate of ketene supplied is fixed or limited, the rate at which the fiber is passed through the chamber must be adjusted to secure the desired amount of absorption and reaction of the ketene.

In an alternative process, the ketene or acetic anhydride may be dissolved in a mineral spirit or other solvent with which it is not reactive, and the synthetic protein fiber immersed in the solution. The solvent may contain a catalyst, such as aluminum chloride or ammonium chloride, and may be heated, if desired, to a temperature of 150 to 170° F. Such a solution may be used as the liquid seal at the exit end of the ketenizer.

In the event that the acylating agent is a liquid, such as acetic anhydride, the synthetic protein fiber is treated by immersing it in the liquid for the required length of time.

When the acylating agent used is gaseous ketene, the matter of polymerization must be considered, because ketene polymerizes to form diketene and other polyketenes. The reaction of diketene with the fiber is undesirable because this imparts a yellow appearance. If this is not desired, it is preferable to treat the fiber with the ketene as soon as possible after its generation, in order that the ketene will not have an opportunity to polymerize before contacting the fiber. The fiber, particularly after it has been reacted with ketene, also appears to have a catalytic effect in causing the polymerization of the ketene.

The extent of the polymerization will therefore be a factor in determining the length of time during which the fiber is treated with ketene. After the fiber has been contacted with the ketene for a period of time, unless carefully controlled, the fiber is apt to turn yellow due to the polymerization of ketene and the reaction of the fiber with the polymerized ketene. It is therefore desirable that if the fiber is to be subjected to ketene for a great length of time, that it be done under carefully supervised and controlled conditions.

It is also possible that the concentration of the ketene is a factor and that the polymerization of the ketene is caused by contacting it with the fibers at a faster rate than the ketene can react with the fiber. Such action would allow an excess of the ketene to surround the fiber and it is possible that this excess polymerizes due to the catalytic effect of the fiber. For this reason it may not be desirable to contact the fiber with too great a concentration of ketene or at too fast a rate, particularly in a counter-current system where the ketene in its most concentrated form is contacted with the less reactive fiber.

The rate of movement of the fiber through the ketenizer and the rate of introduction of the ketene and its concentration must be so regulated as to avoid polymerization but to obtain substantially complete ketenization. These conditions cannot be laid down in any detail because of the many variables involved, but they can readily be determined by the man skilled in the art. These factors will also depend upon the temperature and the presence of a catalyst. At temperatures 180° to 212° F., and with a catalyst, the polymerization of ketene does not present a serious problem.

The chemical action involved in the reaction of the protein with ketene is not entirely understood, although it would appear that the chemical structure of the protein is altered to render it more resistant to oxidation and less reactive chemically. It is believed that any double bonds in the protein are eliminated by the treatment, thereby preventing oxidation and deterioration due to ageing. It is not clear whether the reaction involves the amino groups of the protein, or any hydroxy or carboxyl groups contained by the protein. The fact that the fiber is rendered more resistant to the action of the basic dye-stuffs might indicate that the carboxyl group is altered in the reaction. It may be possible that the amino group is acylated and thus rendered less reactive, and certain changes in the dyeing properties indicate this. The resistance to water would indicate that the hydroxyl groups have been acylated or otherwise altered or eliminated. Some evidence points to a condensation of amino and carboxyl groups with the elimination of water. However, having described my invention, the manner in which it may be accomplished, and the results that are obtained, I believe it is unnecessary to speculate as to any chemical action that takes place, and I do not intend my invention to be limited by any explanation or theory of the results obtained.

Another factor that must be considered in the process is occasioned by the fact that most acylating agents combine with water to form acids. For example, ketene combines with water to form acetic acid. Acetic anhydride combines with water to form acetic acid. If the fiber is wet or moist at the time of acylation, the water content in the fiber will react to form an acid, which in the case of ketene will be acetic acid. The acid may act as a catalyst, but too great an amount is not desirable.

In view of the fact that the fiber should not have too great an amount of water at the time of treatment with the acylating agent, in order not to form too large an amount of acid, the fiber is preferably dried or partially dried prior to the acylating operation. It is therefore necessary to form and process the fiber in such a manner as to permit it to be dried.

In order that the fiber may be dried without the individual filaments sticking together or becoming hard and brittle, it is generally regarded as necessary to treat the fiber with formaldehyde at some stage in its manufacture before drying. The treatment with formaldehyde is not essential to impart any chemical or physical properties to the fiber that are not obtained by acylation, because the final nature of the acylated fiber is substantially the same irrespective of whether or not the fiber has been given an intermediate formaldehyde treatment. However, as pointed out above, it is desirable to give the fiber at least a slight formaldehyde treatment in order that it may be dried without sticking together and becoming brittle.

It is obvious that the formaldehyde treatment is superfluous as far as the final properties of the fiber are concerned and could be eliminated if the fiber could be placed in condition for acylation without the same.

I have discovered that the treatment with formaldehyde may be eliminated or substantially reduced by taking the fiber in the wet stage and washing it in a bath of a dehydrating organic liquid such as acetone or alcohol, preferably acetone, in which a small amount of a fat or fatty acid is dissolved. The fatty material tends to soften the fiber and acts as a catalyst as will be explained later. The dehydrating liquid removes or replaces the moisture in the fiber, and in effect dries it, although such a water removal, under controlled conditions, does not result in the fiber sticking together or becoming brittle.

The fiber, after this treatment, is then acylated as described heretofore. When ketene is employed as the acylating agent it tends to dissolve in the acetone, and the ketene is brought into more intimate and thorough contact with the fiber than it is in the treatment of dry fiber, provided the operation is carried out at a sufficiently low temperature. The acetone that is vaporized during the ketenization may be removed with the methane and recovered by suitable condensing means.

As has been mentioned above, one of the reasons for treating the fiber in a relatively dry state with the ketene is occasioned by the fact that ketene reacts with water to form acetic acid, and if the fibers are too moist they will become impregnated with a relatively large amount of acetic acid at the time they are subjected to the ketene treatment. I have discussed previously how the water content may be removed or lowered by drying or with a dehydrating agent.

I have discovered also that the formation of a certain amount of acetic acid is not a material disadvantage because the acid can be removed by a washing treatment, and inasmuch as the fiber is washed subsequent to ketenization at any event, any economic disadvantage incident to the removal of the acetic acid during the washing is more than offset in the saving effected by only partially drying the fiber, and in lessening the formaldehyde treatment. Water in the fiber in an amount of 10% to 20% appears to assist the ketenization and larger amounts are not a material disadvantage if the amount is not so great as to form sufficient acetic acid to cause gelatinization of the protein.

The ketene appears to have a preference for combining with the protein as compared with the water, and the reaction of the ketene with the protein appears to be completed at about the same rate and with about the same thoroughness even though a portion or all of the water in the fiber may also be converted into acetic acid.

If it is desired to ketenize the fiber containing a relatively high proportion of moisture, the fiber is taken directly from a washing operation and as much of the water removed mechanically, such as by squeezing rollers, as is possible. The fiber in this condition is subjected directly to the ketene treatment as previously explained. The acetic acid formed by the reaction of ketene with the water may be removed from the fiber subsequently.

After the treatment of the fiber with the ketene, the pH value of fiber may be lower than that desired. This is particularly so if the fiber is wet or moist during the ketenization so that an acid has been formed. The fiber may be washed so as to raise its pH value.

I have referred heretofore to the use of a catalyst or agent for facilitating the reaction of the ketene with the synthetic protein fiber. This agent is one that is generally applied to the surface of the fiber, but may be supplied with the ketene gas although the latter is not as expedient from the manufacturing point of view. The agent applied to the surface of the fiber may be any unctuous or fatty material, such as fatty acids and their esters or any substance which has a plasticising effect upon the casein such as glycerine, lanolin, phthalate esters, etc. Such agents are well known as a group and need not be detailed here. I may also use inorganic agents such as aluminum or ammonium chloride. The exact chemistry or mechanism of the action of this agent is not known but it is probably one in which the surface of the casein fiber is softened or opened up to permit a more ready penetration of the ketene, as well as that of true catalysis. Where the agent is one that is capable of combination with ketene or with casein, it may enter into the reaction and combine chemically with the protein or the ketene or both. The amount of the agent that will combine chemically with the fiber is as high as 5½%. At least 2% of the agent on the surface of the fiber at the time of ketenization appears to be desirable from the commercial point of view, and which agent for the most part becomes affixed in the fiber. The resulting product has more marked softness due to the plasticising action of the material incorporated in this way during the ketene treatment.

While I have referred to the reaction facilitating agent as a catalyst, because it speeds the reaction of the ketene with the protein, this term may not be entirely accurate in its strict chemical sense in all instances, since a part or all of the agent may enter into the reaction.

From the manufacturing point of view, the presence of a catalyst is very important because of the increase in the speed of the reaction as well as its completeness. If the fiber does not contain such an agent in its composition, or on its surface, or contains only a very small amount, the reaction with the ketene is much slower and much less complete, particularly at lower temperatures. While the reaction can be completed at any temperature without the catalyst, a much longer time is required and the fiber must be exposed to higher concentrations of ketene.

The treatment with such an agent is a very simple way of introducing a plasticising material into the fiber. By using a softening material as a catalyzer, it is possible to incorporate a plasticizer in a fiber made from casein dispersed solely with caustic and to obtain a fiber that has the equivalent or better properties than a fiber containing a plasticizer in the protein solution before it is spun.

If desired, however, a fatty or softening material may be incorporated in the protein solution prior to the time it is spun into fiber, and if this is done, the softening material thus present in the fibers at the time of ketenization will be fixed by the ketene treatment and will facilitate the ketenization. In general, however, I have found that the production of fibers may be better controlled by omitting from the spinning solution any fatty or plasticising material and applying this to the surface of the fiber prior to ketenization and affixing it during this treatment.

The fatty or softening material may be applied to the surface of the fiber in any operation prior to the ketenization. I have found that this may be done simultaneously with the neutralization of the fiber. As the fiber comes from its manufacturing process, it is relatively acid due to the fact that it is coagulated in an acid solution. It is desirable to neutralize a part or all of this acidity, and this can be done by treating the fiber with a soap solution. The acid in the fiber decomposes the soap and the alkali constituents neutralize the acid in the fiber while the fatty constituent of the soap is precipitated upon the fiber. This fatty material serves effectively as the catalyst in the ketenizing operation. As an alternative process, the fiber may be neutralized as a separate step and then treated with the catalyst.

After the acylation treatment, the synthetic protein fiber has at least the same physical properties, i. e., the same softness, and strength, as the untreated fiber, and the treatment is not intended to alter these properties in any respect when properly carried out. It many instances these properties are improved. The acylated fiber is much more resistent to water than is the unaltered fiber. It does not take on a slimy feel after being immersed with hot water, and upon drying does not become brittle. It can be subjected to boiling dye solutions, and retain its original soft, flexible properties.

The acylated fiber can be placed in solution only with great difficulty, and a relatively large amount of alkali is required to effect solution.

Synthetic protein fiber that has been acylated has substantially the same dyeing properties as natural wool in that it is colored by the same dyes which color wool, and is not affected by dyes that do not affect wool.

In order to appreciate more particularly the properties of the fiber, it is pointed out that a synthetic protein fiber ketenized in accordance with the invention is capable of being boiled in a solution having a pH value of as high as 8 without material alteration in its properties, whereas the untreated fiber would be rendered entirely useless if boiled in solutions of such alkalinity.

The ketenized fiber is also capable of being heated in a dye bath at a dyeing temperature (80° to 100° C.) for at least an hour, even though such solutions are quite acid.

The dyeing properties of the fiber treated in accordance with the invention can be illustrated with reference to a standard dyeing solution containing 2% sodium sulfate, 10 milligrams Pontamine Fast Blue Arl, Colour Index No. 319, in 100 c. c. of an aqueous solution. A one-half gram sample of the fiber is used for each 100 c. c. of solution and dyed for about five minutes at 90° C. plus or minus 2°; the pH of the solution has a value of 4 to 5, preferably 4.5. An untreated fiber will absorb 60 milligrams of dye per gram of sample, whereas a fiber completely ketenized in accordance with the invention will absorb less than .1 to .2 milligram. The latter will result in a faint blue color which is equivalent to or better than the absorption of this dye by wool which is of the order of 1 to 3 milligrams of dye per gram of sample.

The extent of ketenization will control to a large extent the amount of dye absorbed, and if desired the ketenization may be terminated at such a time that the fiber will absorb from 1 to 3 milligrams or less than 5 milligrams per sample. As far as I am aware, the best synthetic protein fiber produced heretofore has absorbed 12 to 20 milligrams of dye per gram sample.

The word "synthetic" as used in this application does not refer to a characteristic of the protein per se, but rather refers to the physical form of the protein, such as fiber, which form or shape is different than that of the naturally occurring form of the protein from which the synthetically formed materials are made.

It will be obvious that my invention includes many variations and modifications, particularly with reference to the material being treated, the treating agent, and the mode of treatment. I intend all such variations and modifications, as are included in the following claims, to be a part of my invention.

This application is a continuation-in-part of my application Serial Number 242,279, filed November 25, 1938.

I claim:

1. A method of treating a material synthetically formed by coagulating with an acid an alkaline-dispersible acid-coagulable protein dispersion comprising casein, which method comprises reacting said material with an anhydride of acetic acid selected from the group consisting of acetic anhydride and ketene.

2. A method of treating material formed by acidic coagulation of a dispersion of an alkaline-dispersible acid-coagulable protein hardened with formaldehyde which comprises reacting it with an acylating agent selected from the group consisting of acetic anhydride and ketene.

3. A method of treating a material shaped by acidic coagulation of a dispersion of an alkaline-dispersible acid-coagulable protein and hardened with formaldehyde and which material contains a small amount of moisture, which method comprises reacting said material with an acylating agent selected from the group consisting of acetic anhydride and ketene and in the presence of acetic acid formed by the reaction of said moisture with said acylating agent.

4. The method of treating synthetic casein fiber which comprises reacting a coagulated and hardened casein fiber with ketene.

5. A method of treating fiber formed from an alkaline-dispersible acid-coagulable protein which comprises reacting it, while under tension, with an acylating agent selected from the group consisting of acetic anhydride and ketene.

6. A method of treating synthetically formed, formaldehyde hardened, casein fiber which comprises reacting it with ketene.

7. The method of treating an alkaline-dispersible acid-coagulable protein material which comprises reacting it with an acylating agent selected from the group consisting of acetic anhydride and ketene in the presence of a catalyst.

8. The method of treating synthetic casein fiber which comprises applying a higher fatty acid to said fiber and reacting it with ketene at an elevated temperature.

9. The method of treating fiber which is formed by acidic coagulation of a dispersion of an alkaline-dispersible acid-coagulable protein which comprises applying a soap to said fiber while said fiber is in an acid condition, and thereafter reacting it with an acylating agent selected from the group consisting of acetic anhydride and ketene.

10. The method of treating synthetic casein fiber which comprises contacting said fiber with a fatty acid and reacting it at an elevated temperature with an acylating agent selected from the group consisting of acetic anhydride and ketene.

11. A continuous process of treating fiber which is formed by acidic coagulation of a dispersion of an alkaline-dispersible acid-coagulable protein which comprises continuously passing a strand of filaments of said fiber through an elongated confined space and reacting said fiber with ketene contained in said space.

12. Ketenized synthetic casein fiber resistant to hot water and acid and alkaline solutions and having dyeing properties similar to those of natural wool.

13. A synthetic protein-base fiber comprising an alkaline-dispersible acid-coagulable protein fiber comprising casein acylated with an anhydride of acetic acid selected from the group consisting of acetic anhydride and ketene.

14. A synthetic casein-base fiber comprising a casein-formaldehyde complex acylated with an anhydride of acetic acid selected from the group consisting of acetic anhydride and ketene.

15. A synthetic protein-base fiber shaped from an alkaline-dispersible acid-coagulable protein, hardened with formaldehyde and acylated with an anhydride of acetic acid selected from the group consisting of acetic anhydride and ketene so as to have properties similar to those of natural wool in that the fiber does not become brittle upon drying after treatment in boiling aqueous solutions and has dyeing properties similar to those of natural wool.

16. A method of treating a material shaped by acidic coagulation of a casein dispersion and hardened with formaldehyde and which material contains a small amount of moisture, which method comprises reacting said material with an acylating agent selected from the group consisting of acetic anhydride and ketene and in the presence of acetic acid formed by the reaction of said moisture with said acylating agent.

17. A synthetic casein-base fiber shaped from casein, hardened with formaldehyde, and acylated with an anhydride of acetic acid selected from the group consisting of acetic anhydride and ketene so as to have properties similar to those of natural wool in that the fiber does not become brittle upon drying after treatment in boiling aqueous solutions and has dyeing properties similar to those of natural wool.

18. A synthetic protein-base fiber comprising soya bean protein acylated with an anhydride of acetic acid selected from the group consisting of acetic anhydride and ketene.

FRANCIS CLARKE ATWOOD.

CERTIFICATE OF CORRECTION.

Patent No. 2,342,634. February 29, 1944.

FRANCIS CLARKE ATWOOD.

It is hereby certified that error appears in the printed specification of the above numbered patent requiring correction as follows: Page 3, second column, line 6, for "ketent" read --ketene--; page 6, second column, line 54, claim 4, before "ketene" insert --a--; and that the said Letters Patent should be read with this correction therein that the same may conform to the record of the case in the Patent Office.

Signed and sealed this 25th day of April, A. D. 1944.

Leslie Frazer

(Seal) Acting Commissioner of Patents.